United States Patent
Guyette (10) Patent No.: US 11,297,967 B2
(45) Date of Patent: Apr. 12, 2022

(54) CURTAIN FOR STORAGE RACK

(71) Applicant: American Business Forms, Inc., Glenwood, MN (US)

(72) Inventor: Gregory Scott Guyette, St. Petersburg, FL (US)

(73) Assignee: American Business Forms, Inc., Glenwood, MN (US)

(*) Notice: Subject to any disclaimer, the term of this patent is extended or adjusted under 35 U.S.C. 154(b) by 104 days.

(21) Appl. No.: 16/779,825

(22) Filed: Feb. 3, 2020

(65) Prior Publication Data

US 2020/0245802 A1 Aug. 6, 2020

Related U.S. Application Data (60) Provisional application No. 62/801,402, filed on Feb. 5, 2019.

(51) Int. Cl.
| | | |
|---|---|---|
| *A47H 13/04* | (2006.01) | |
| *B65G 1/02* | (2006.01) | |
| *A47B 47/00* | (2006.01) | |
| *A47B 47/03* | (2006.01) | |

(52) U.S. Cl.
CPC .......... *A47H 13/04* (2013.01); *B65G 1/026* (2013.01); *A47B 47/0083* (2013.01); *A47B 47/0091* (2013.01); *A47B 47/03* (2013.01)

(58) Field of Classification Search
CPC .......... A47H 13/04; B65G 1/026; B65G 1/02; A47B 47/0083; A47B 47/0091; A47B 47/03; A47B 2220/09
See application file for complete search history.

(56) References Cited

U.S. PATENT DOCUMENTS

| | | | | |
|---|---|---|---|---|
| 673,703 | A * | 5/1901 | Davis et al. .............. | E06B 9/02 49/465 |
| 844,687 | A * | 2/1907 | Miller et al. .............. | A47F 5/10 211/175 |
| 1,206,759 | A * | 11/1916 | Hanauer ................ | A47H 13/04 24/345 |
| 2,553,980 | A * | 5/1951 | Ostrander .............. | A01K 73/12 43/14 |
| 3,527,319 | A * | 9/1970 | Pedley ..................... | A62B 1/22 182/139 |
| 3,968,528 | A * | 7/1976 | Poerink .................. | A47C 31/06 5/211 |
| 4,800,947 | A * | 1/1989 | Loomis ............... | G09F 15/0025 160/368.1 |
| 4,852,194 | A * | 8/1989 | Langan ................ | A47D 15/005 5/427 |

(Continued)

FOREIGN PATENT DOCUMENTS

| | | | | |
|---|---|---|---|---|
| DE | 2301886 A1 * | 7/1974 | ............. | A47H 13/04 |
| EP | 2174892 A1 * | 4/2010 | ............... | B65G 1/02 |

*Primary Examiner* — Stanton L Krycinski
(74) *Attorney, Agent, or Firm* — Merchant & Gould P.C.

(57) ABSTRACT

An example curtain system can include: a curtain forming a flexible body with an opening at each corner of the body; a tensioning device at each corner of the body of the curtain to couple the curtain to a backside of a rack, wherein each tensioning device includes a hook member with a first end sized to engage an opening in the rack and a threaded second end; and a nut configured to be threaded onto the threaded second end of the hook member to tension the curtain relative to the rack.

15 Claims, 13 Drawing Sheets

(56) References Cited

U.S. PATENT DOCUMENTS

| | | | | |
|---|---|---|---|---|
| 4,981,225 A * | 1/1991 | Cole | ...................... | B65G 1/02 211/180 |
| 4,986,389 A * | 1/1991 | Halligan, Sr. | ............ | E04G 21/28 182/138 |
| 5,046,545 A * | 9/1991 | Loomis | ................ | G09F 15/0025 160/368.1 |
| 5,170,829 A * | 12/1992 | Duncan | .................... | B65G 1/02 160/194 |
| 5,452,973 A * | 9/1995 | Arvin | .................... | B60P 7/0876 410/117 |
| 5,573,125 A * | 11/1996 | Denny | .................... | A47B 96/00 160/84.01 |
| 5,787,955 A * | 8/1998 | Dargie | .................... | E02D 29/12 160/368.1 |
| 5,791,501 A * | 8/1998 | Baldwin, Jr. | ........... | A47B 97/00 108/27 |
| 5,984,121 A * | 11/1999 | Cole | ...................... | B65G 1/02 211/183 |
| 6,068,085 A * | 5/2000 | Denny | .................... | A62B 1/22 182/138 |
| 6,098,750 A * | 8/2000 | Reynolds | ................ | A62B 1/22 182/112 |
| 6,116,438 A * | 9/2000 | Lovett | .................... | B65G 1/02 211/14 |
| 6,161,648 A * | 12/2000 | Rexroad | .................. | A62B 1/22 182/138 |
| 6,182,790 B1 * | 2/2001 | Denny | .................... | A62B 1/22 182/138 |
| 6,186,274 B1 * | 2/2001 | Reynolds | ................ | A62B 1/22 182/112 |
| 6,345,944 B1 * | 2/2002 | Florence | ................ | B60P 7/0876 410/118 |
| 6,585,122 B2 * | 7/2003 | Calleja | .................... | A47F 5/01 211/180 |
| 6,609,621 B2 * | 8/2003 | Denny | ................ | A47B 47/021 211/180 |
| 6,619,490 B2 * | 9/2003 | Calleja | .................... | A47F 5/01 211/180 |
| 6,698,604 B2 * | 3/2004 | Denny | ................ | A47B 47/021 182/138 |
| 6,722,512 B2 * | 4/2004 | Scully | .................... | A47F 5/13 211/175 |
| 6,805,187 B2 * | 10/2004 | Padiak | .................... | A47B 96/00 160/214 |
| 6,938,785 B2 * | 9/2005 | Denny | .................... | A47F 13/00 211/183 |
| 7,008,154 B1 * | 3/2006 | Nolle | .................... | B60R 7/005 410/118 |
| 7,014,053 B2 * | 3/2006 | Calleja | .................... | A47F 5/01 182/138 |
| 7,168,197 B2 * | 1/2007 | Siegenthaler | ............. | G09F 7/18 160/378 |
| 7,191,907 B2 * | 3/2007 | Conway | ............... | A47B 47/027 182/138 |
| 8,672,092 B2 * | 3/2014 | Black | ........................ | E04G 5/00 182/150 |
| 8,740,525 B2 * | 6/2014 | Coury | ...................... | B60P 7/06 410/118 |
| 8,807,894 B2 * | 8/2014 | Bistuer | ................ | B60P 7/0876 410/97 |
| 10,030,397 B2 * | 7/2018 | Stearns | .................... | A62B 1/22 |
| 10,093,241 B2 * | 10/2018 | Hughes | ...................... | B60R 7/02 |
| 10,413,068 B2 * | 9/2019 | King | ........................ | B65G 1/02 |
| 10,842,270 B2 * | 11/2020 | Clarke | ...................... | B65G 1/02 |
| 2004/0079586 A1 * | 4/2004 | Walls | ........................ | E04G 5/14 182/138 |
| 2004/0182809 A1 * | 9/2004 | Calleja | .................... | A47F 5/132 211/180 |
| 2004/0211740 A1 * | 10/2004 | Denny | .................... | B65G 1/02 211/183 |
| 2005/0000928 A1 * | 1/2005 | Calleja | ...................... | F16P 1/02 211/183 |
| 2005/0103736 A1 * | 5/2005 | Calleja | ................... | A47B 96/00 211/189 |
| 2005/0263470 A1 * | 12/2005 | Homeland | ............... | B65G 1/02 211/183 |
| 2006/0042673 A1 * | 3/2006 | Tseng | ...................... | E04H 15/32 135/117 |
| 2007/0187349 A1 * | 8/2007 | Calleja | ................... | A47B 96/00 211/189 |
| 2008/0272675 A1 * | 11/2008 | Denny | .................... | A47B 96/00 312/210 |
| 2008/0283202 A1 * | 11/2008 | Serio, III | ............... | A47H 23/08 160/123 |
| 2010/0102015 A1 * | 4/2010 | Benneche | ................ | A47B 97/00 211/183 |
| 2013/0078049 A1 * | 3/2013 | Bistuer | ................ | B60P 7/0876 410/97 |
| 2013/0121785 A1 * | 5/2013 | Coury | ................... | B60P 7/0876 410/97 |
| 2016/0374484 A1 * | 12/2016 | Abernathy | ............ | E04H 15/005 160/351 |

\* cited by examiner

CURTAIN FOR STORAGE RACK

INTRODUCTION

Inventory shrinkage occurs in warehouse-style retail settings when merchandise is pushed or otherwise falls from the back of the warehouse-style shelving. In many instances, an air space (or flue) is present between back-to-back racking sets, making retrieval of the products impractical, dangerous, or even impossible. The amount of product lost or damaged due to this condition can be measured in millions of dollars.

SUMMARY

An example curtain system can include: a curtain forming a flexible body with an opening at each corner of the body; a tensioning device at each corner of the body of the curtain to couple the curtain to a backside of a rack, wherein each tensioning device includes a hook member with a first end sized to engage an opening in the rack and a threaded second end; and a nut configured to be threaded onto the threaded second end of the hook member to tension the curtain relative to the rack.

DETAILED DESCRIPTION

The present disclosure is directed to curtains positioned to stop items from falling off storage racks. In some examples, the storage racks can be provided in a retail environment to hold merchandise for storage and/or sale.

Figure 1:
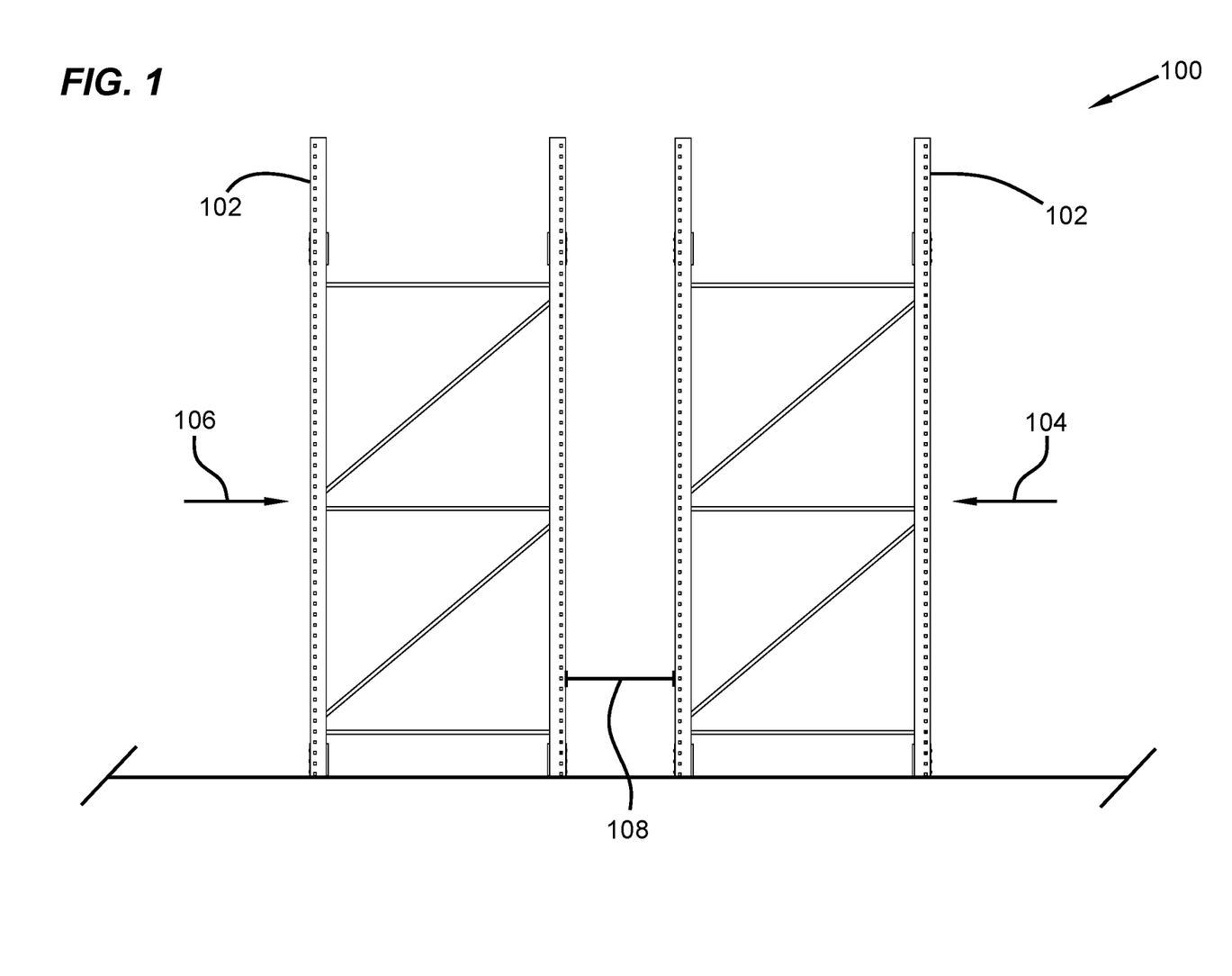
FIG. 1 shows an example warehouse environment.
Figure 2:
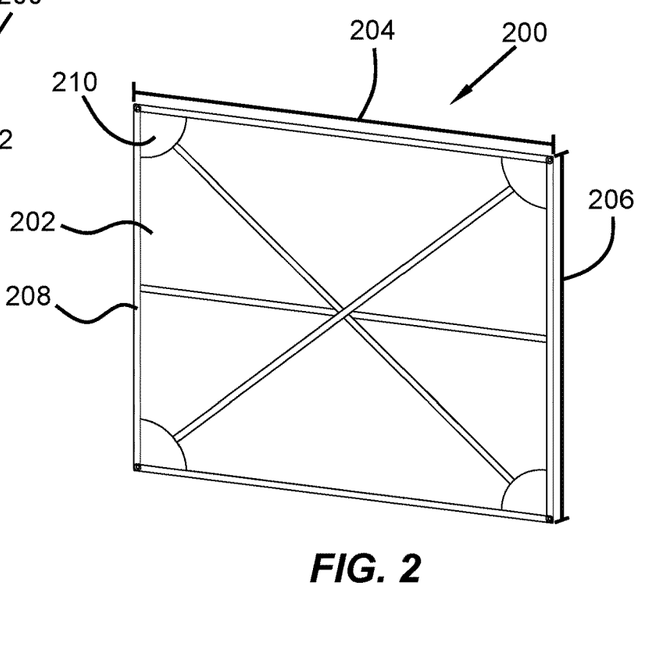
FIG. 2 shows an example curtain.
Figures 3, 4:
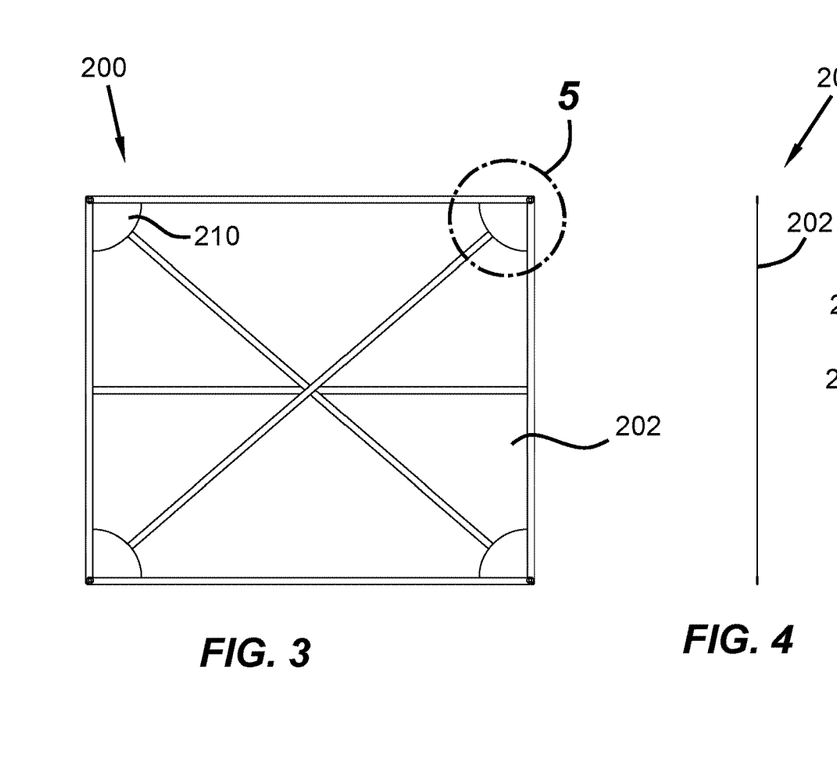
FIG. 3 shows another view of the curtain of FIG. 2.
FIG. 4 shows another view of the curtain of FIG. 2.
Figure 5:
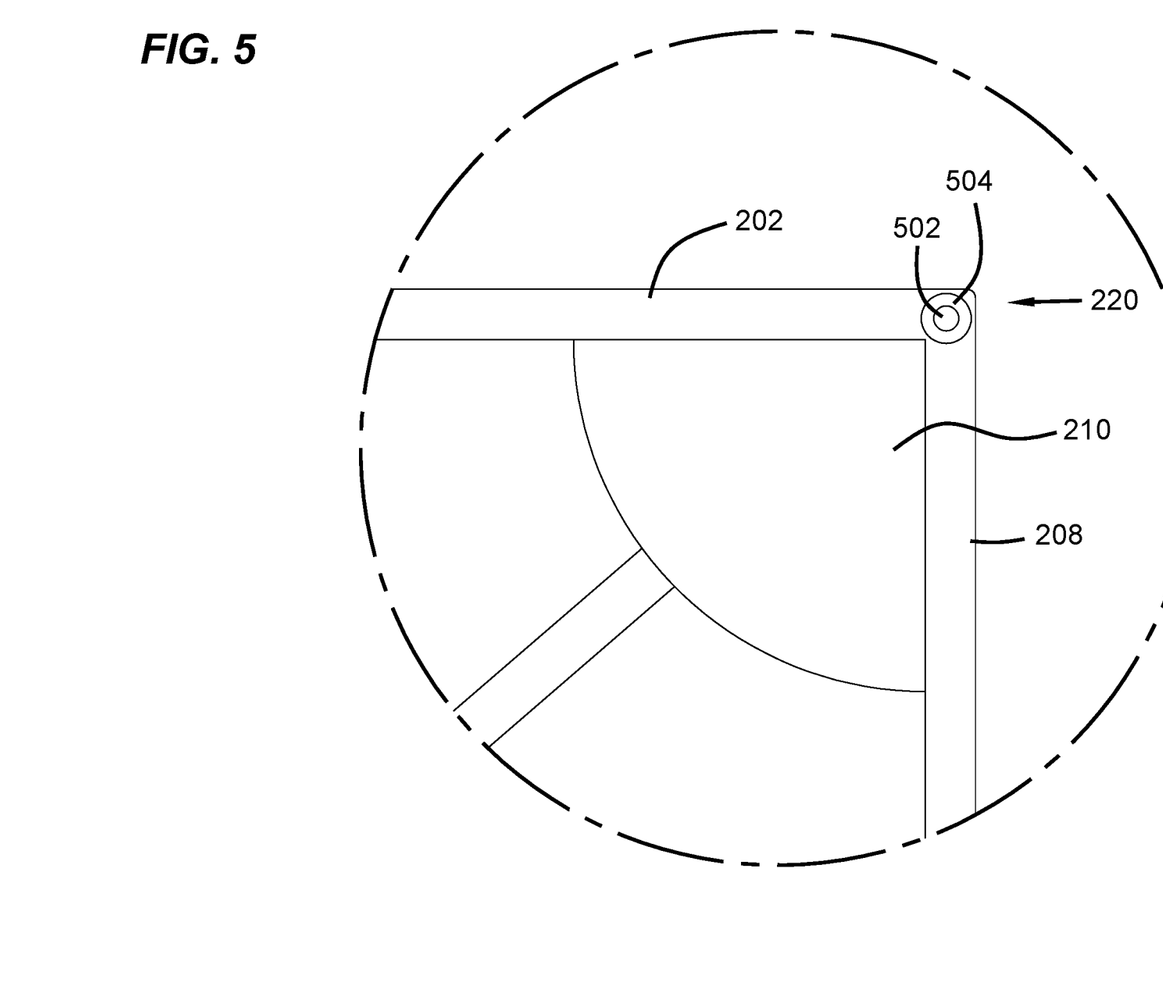
FIG. 5 shows another view of a portion of the curtain of FIG. 2.
Figure 6:
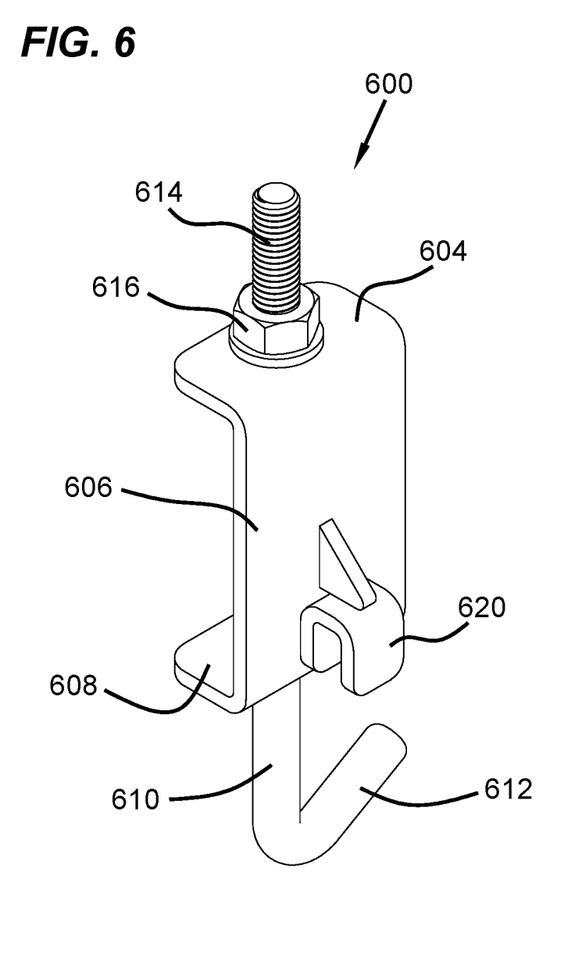
FIG. 6 shows an example tensioning device.
Figure 7:
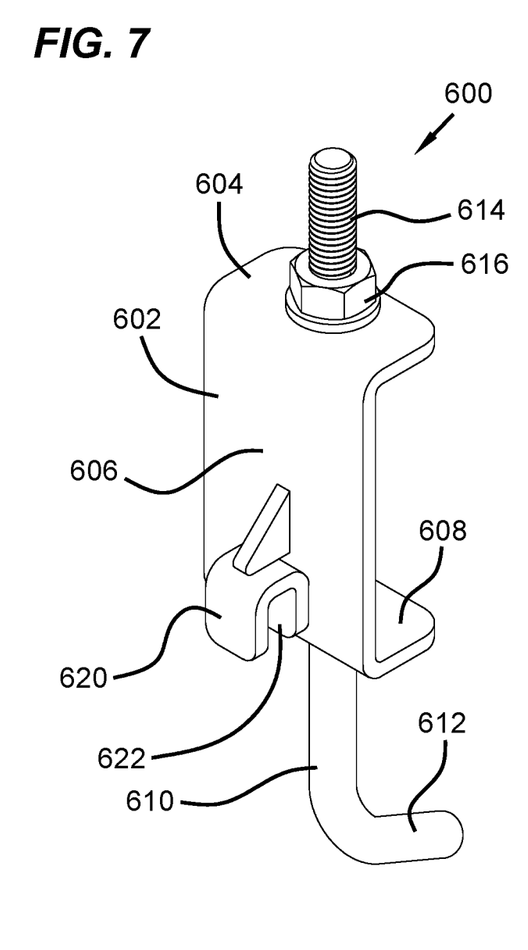
FIG. 7 shows another view of the tensioning device of FIG. 5.
Figure 8:
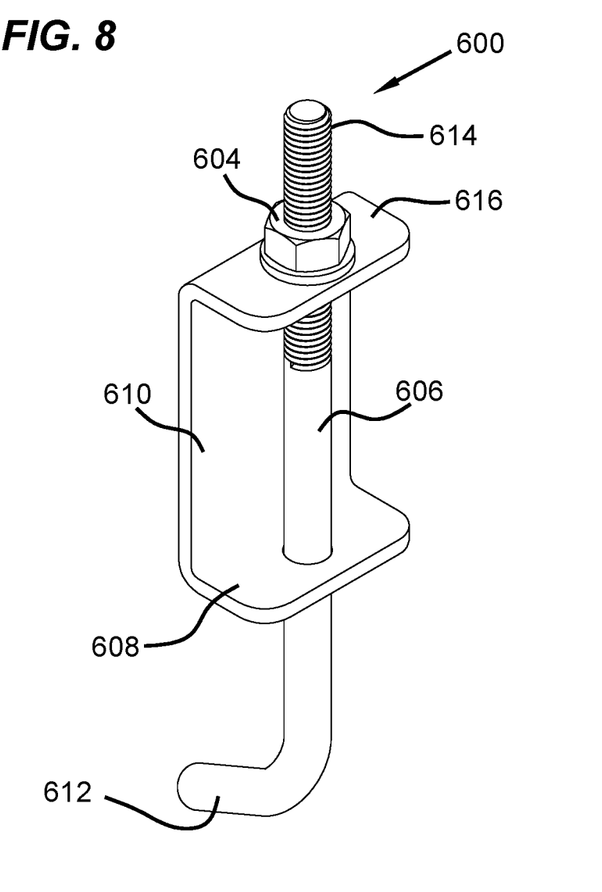
FIG. 8 shows another view of the tensioning device of FIG. 5.
Figure 9:
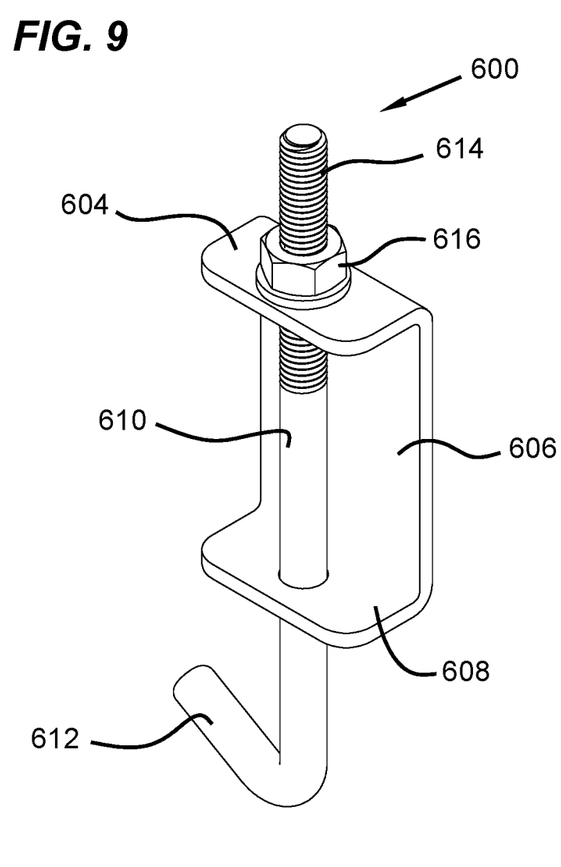
FIG. 9 shows another view of the tensioning device of FIG. 5.
Figure 10:
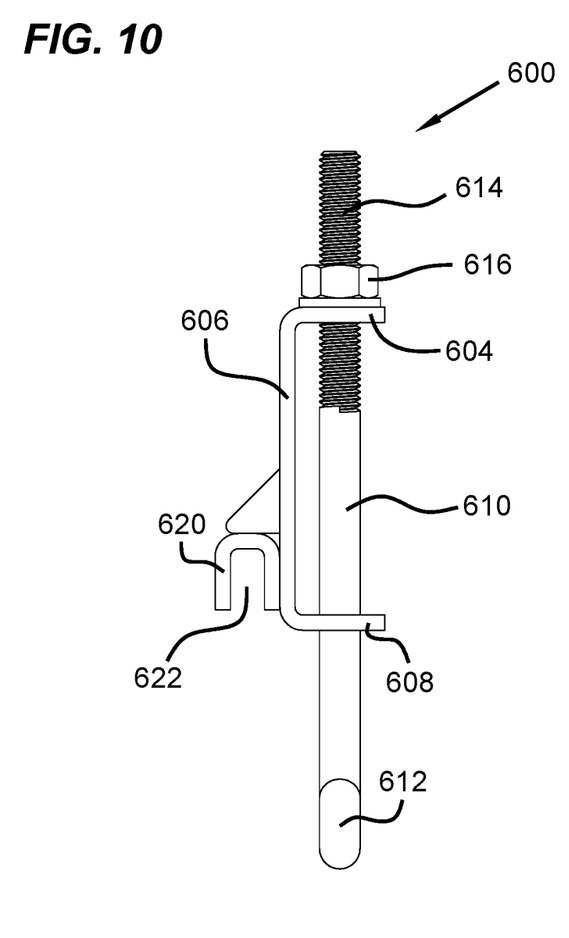
FIG. 10 shows another view of the tensioning device of FIG. 5.
Figure 11:
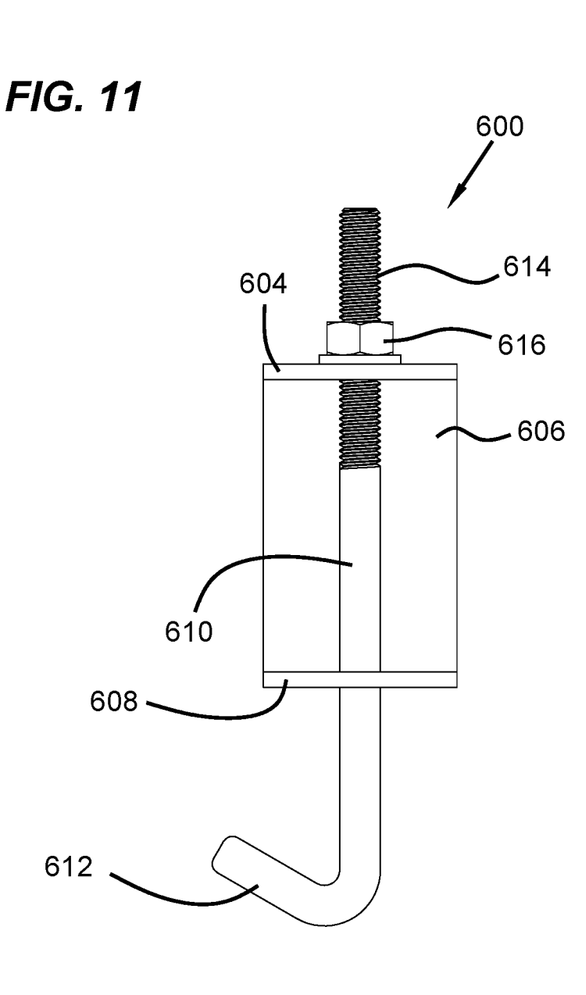
FIG. 11 shows another view of the tensioning device of FIG. 5.
Figure 12:
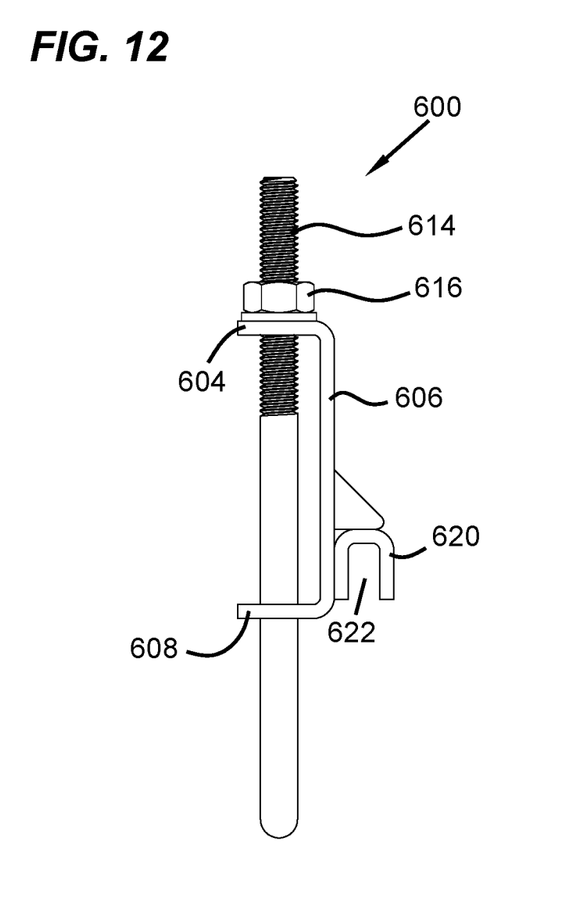
FIG. 12 shows another view of the tensioning device of FIG. 5.
Figure 13:
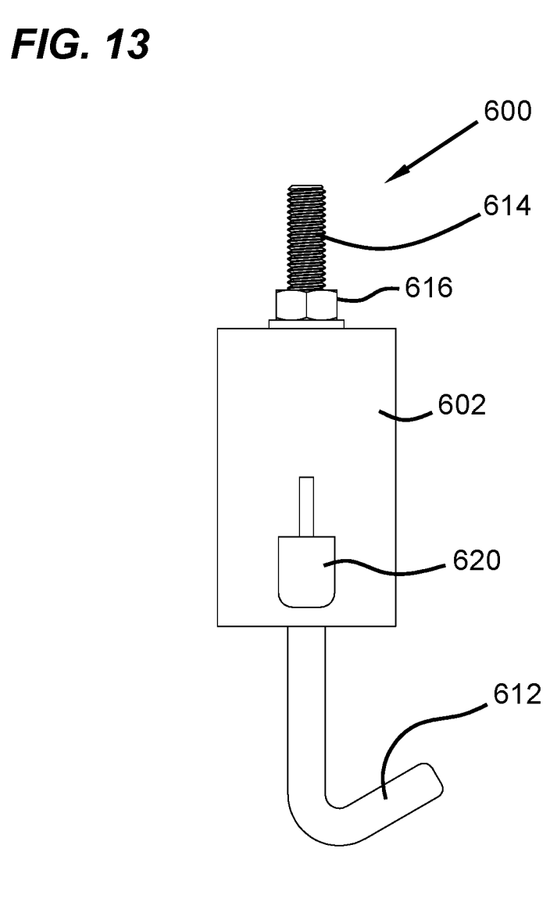
FIG. 13 shows another view of the tensioning device of FIG. 5.
Figure 14:
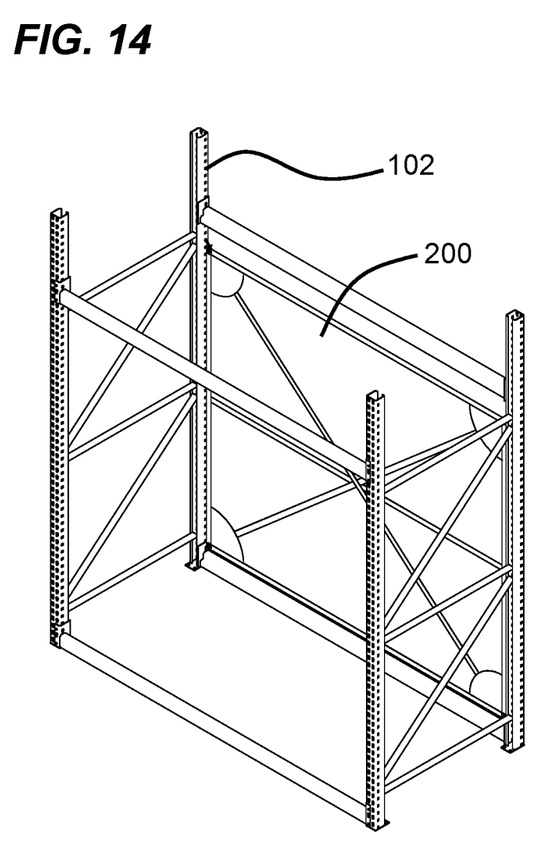
FIG. 14 shows an example rack with the curtain of FIG. 2.
Figure 15:
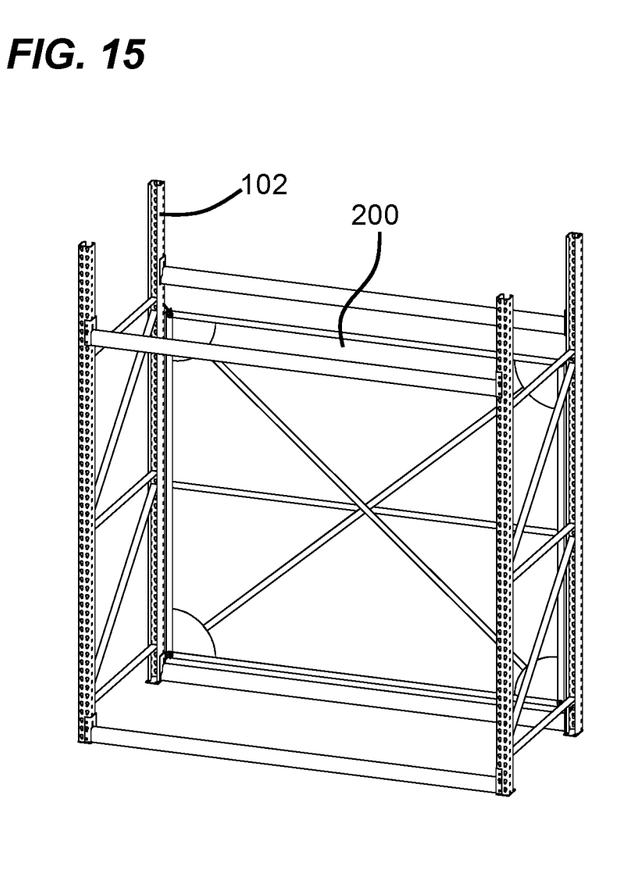
FIG. 15 shows another view of the rack and curtain of FIG. 14.
Figure 16:
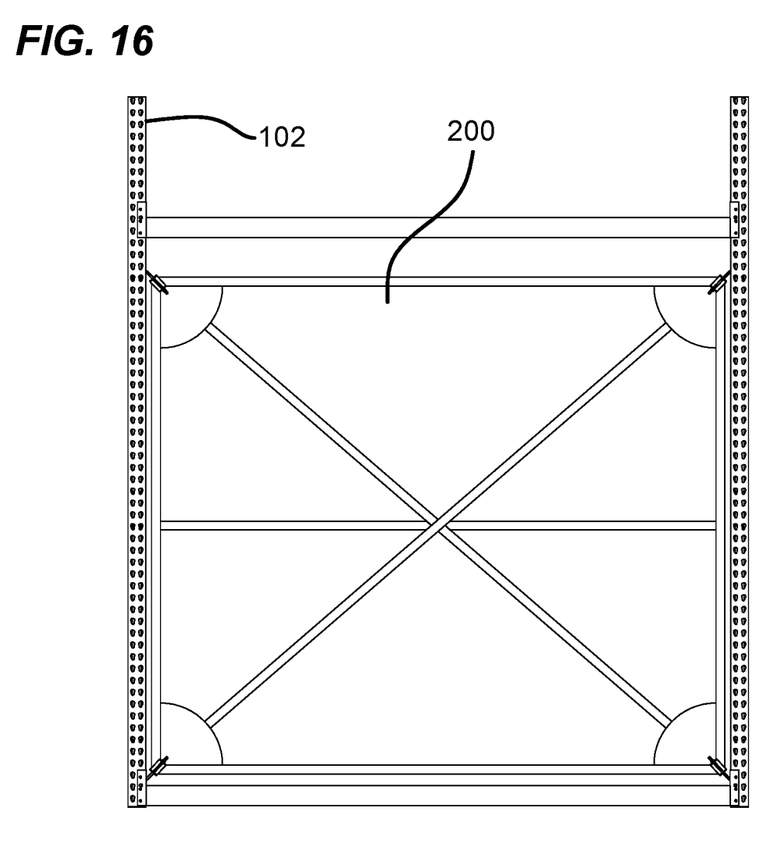
FIG. 16 shows another view of the rack and curtain of FIG. 14.
Figure 17:
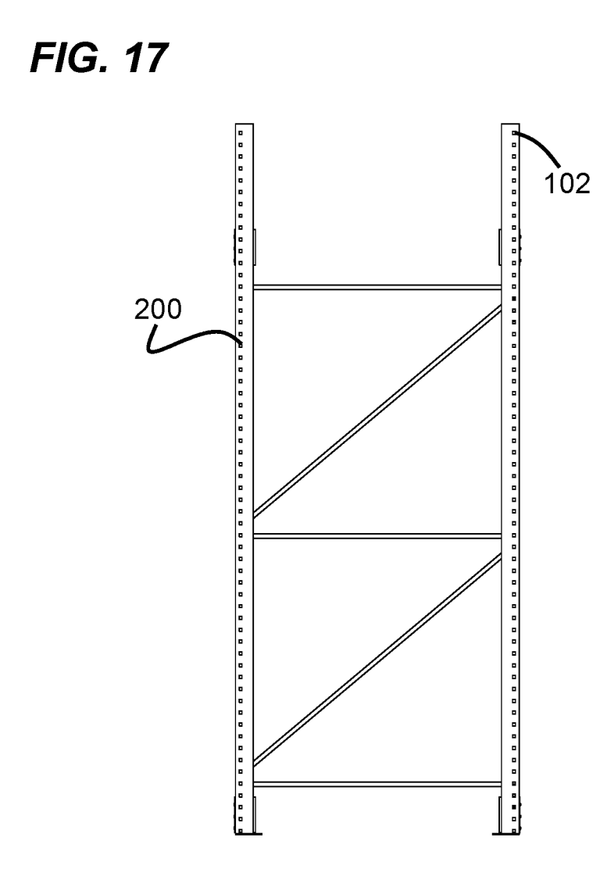
FIG. 17 shows another view of the rack and curtain of FIG. 14.
Figure 18:
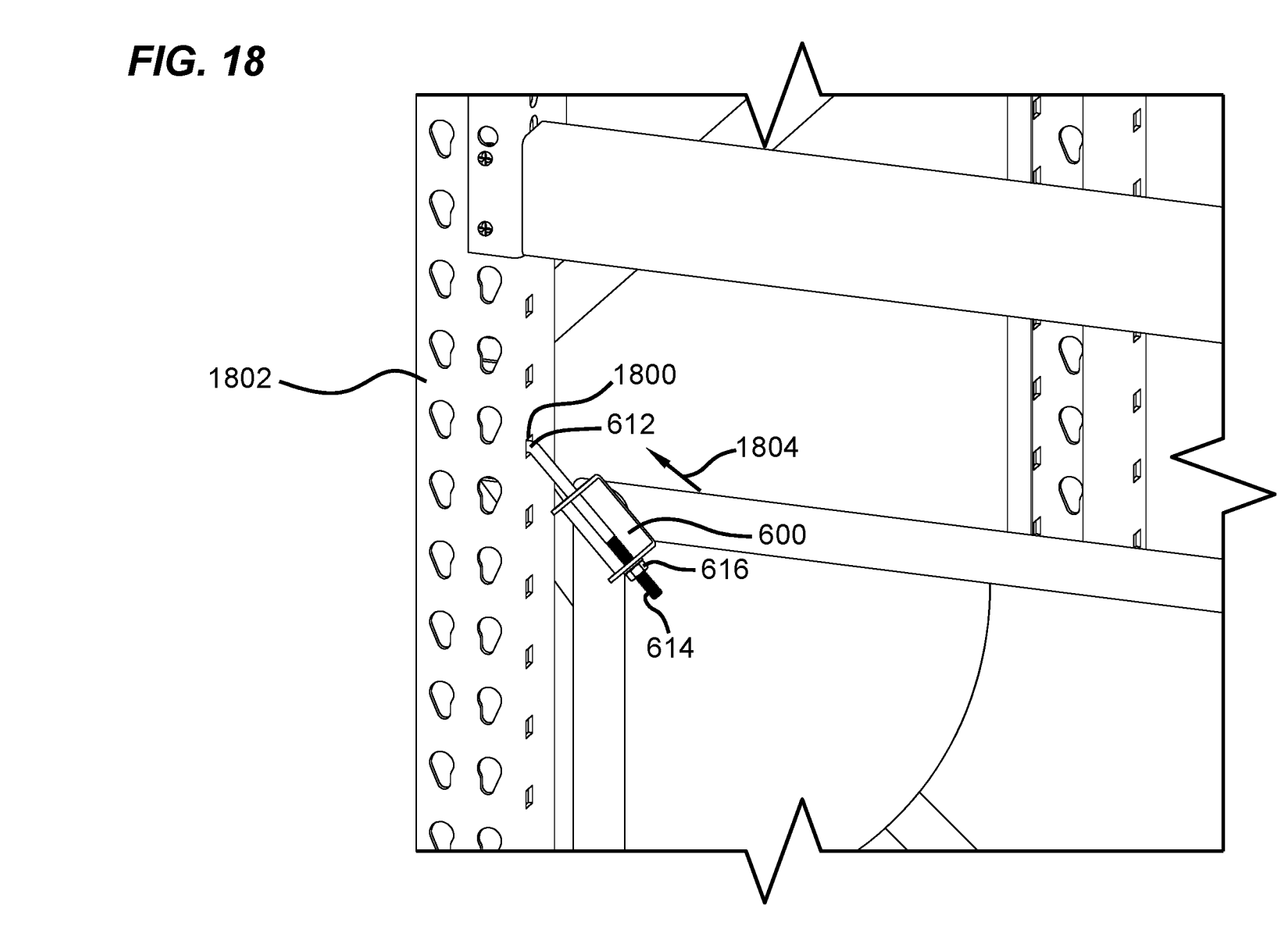
FIG. 18 shows another view of a portion of the rack and curtain of FIG. 14.
Figure 19:
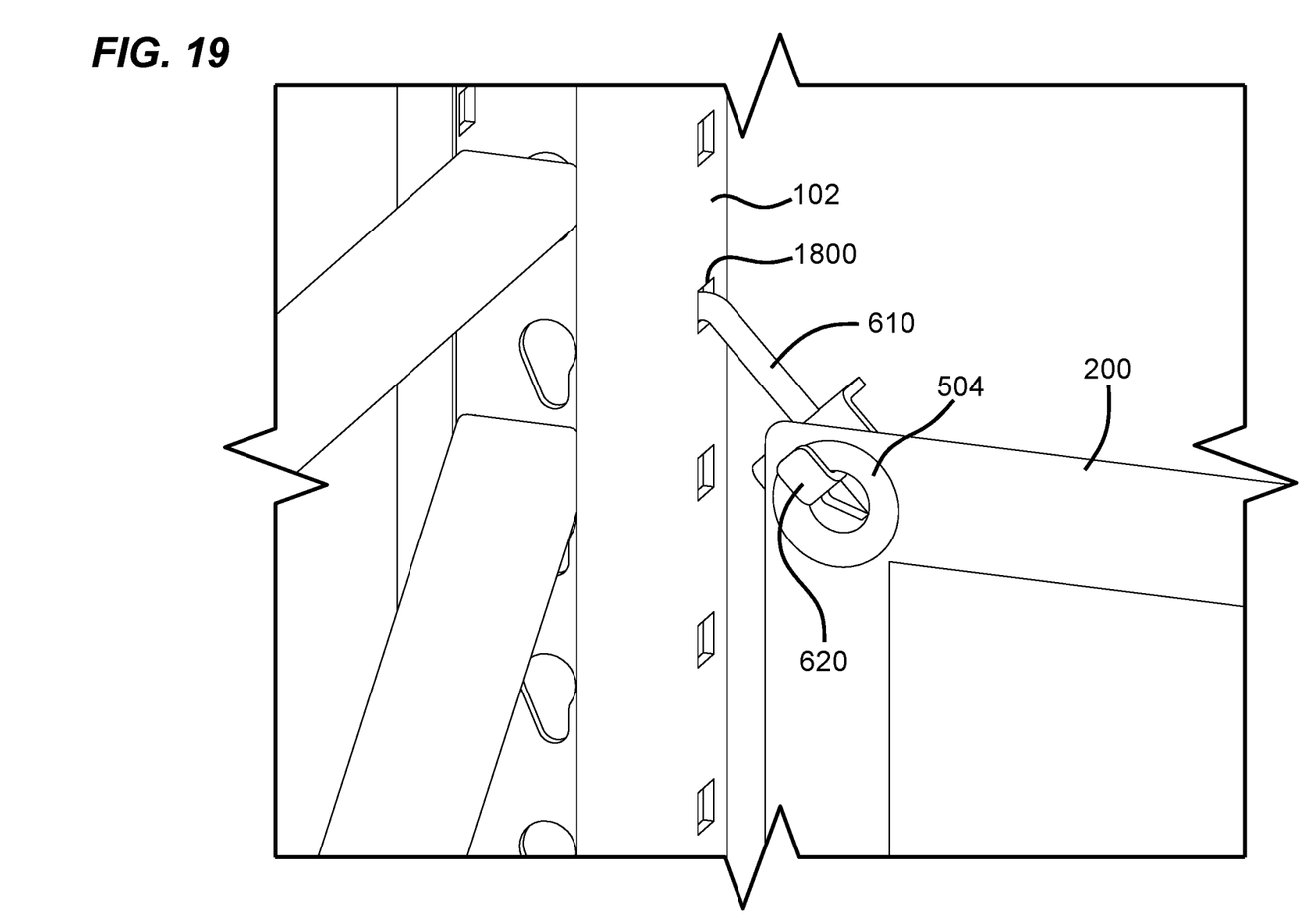
FIG. 19 shows another view of a portion of the rack and curtain of FIG. 14.

For example, referring to FIG. 1, an example retail environment 100 is provided. In this example, the environment 100 includes two racks 102, positioned in a back-to-back arrangement. Such a configuration can be typical in big-box retail stores, where the racks 102 are used to hold merchandise for storage and/or sale. Each of the racks 102 includes vertical and horizontal members with shelves attached thereto for holding the merchandise. In this environment 100, hundreds of racks 102 of multiple stories are provided. One example of such a store is The Home Depot Inc. of Atlanta, Ga.

An open space 108 (sometimes referred to as a flue) is formed between the backsides of each of the racks 102. Items on the racks 102 could inadvertently be pushed in directions 104, 106 off the backside of the racks 102 into the open space 108. The size and location of the open space 108 makes it difficult or impossible to access and retrieve such items. In other configurations, the open space 108 could be formed between the backside of the rack 102 and another obstruction, such as a wall behind the rack 102.

Referring now to FIGS. 2-5, an example curtain 200 is shown. The curtain 200 includes a width 204 and a height 206 sized to span a substantial portion of the backside of the rack 102. The width 204 and height 206 can be modified as needed depending on the dimensions of the rack 102. In these examples, the width ranges between 48 inches and 105 inches, and the height ranges between 24 inches and 100 inches. In some non-limiting examples, the width and height are 97 inches by 84 inches, 85 inches by 84 inches, or 49 inches by 84 inches. Other dimensions are possible. The curtain 200 general functions as a backstop to minimize or stop items on the rack 102 from falling off the backside of the rack into the open space 108.

In this example, the curtain 200 includes a body 202 that is a durable polyester film material with exceptional tensile strength, dimensional stability and minimal stretch (less than one percent). In some examples, the curtain 200 is made of a polyester sailcloth (chosen for durability and consistency), although other materials can be used. For instance, a film material that is fire-retardant can be used. Openings 502 are formed at each corner 220 of the curtain 200. A grommet 504 (e.g., silver or brass #5 grommet) is positioned in each of the openings 502 for equal and substantial tension to be applied, as described further below.

A small amount of "hollow" is optionally cut into the perimeter edges 208 of the body 202 of the curtain 200, allowing the sides to grow under load, thereby tensioning a middle of the body 202. The body 202 is optionally stitched using a fiber or a similar thread (e.g., a monofilament thread made of fluorocarbon or nylon) to provide strength on the perimeter 208, on seams and in the bias direction when tension is applied in from the four corners 220. Film-reinforced radius corners 210 optionally provide significant fortification to the grommets 504, not allowing them to tear through the film under load.

Referring now to FIGS. 6-13, a tensioning device 600 is provided at each of the corners 220 of the body 202 of the curtain 200 to connect the curtain 200 to the rack 102. Each tensioning device 600 includes a generally U-shaped body 602 formed by portions 604, 606, 608.

Portions 604, 608 of each tensioning device 600 include openings through which a hook member 610 extends. A first end 612 of the hook member 610 is bent to engage one of the openings on the rack 102. A second end 614 of the hook member 610 is threaded. A nut 616 is positioned on the second end 614 of the hook member 610. The nut 616 is rotated (e.g., threaded using a deep-well socket) to provide tension to the curtain 200 during installation. The portion 606 of each tensioning device 600 includes a member 620 with an opening 622 sized to engage the grommet 504 to couple the body 202 of the curtain 200 to the tensioning device 600, as described further below.

Referring now to FIGS. 14-19, the curtain 200 is shown in place on the rack 102. The member 620 of each of the tensioning devices 600 engages the respective grommet 504 in each of the corners of the body 202 of the curtain. The first end 612 of each of the hook members 610 of the tensioning device 600 is positioned in a respective opening 1800 formed in a vertical member 1802 of the rack 102.

In this position, the nut 616 of each of the tensioning devices 600 is successively tightened (e.g., using a socket wrench or similar tool) to pull the curtain in a direction 1804 until the curtain 200 is securely positioned. Due to the curtain 200 spanning the open back of the rack 102, and given the strength of the curtain 200, the curtain 200 can resist or stop items on the rack 102 from falling off the backside of the rack 102 (e.g., into the open space 108).

Figure 20:
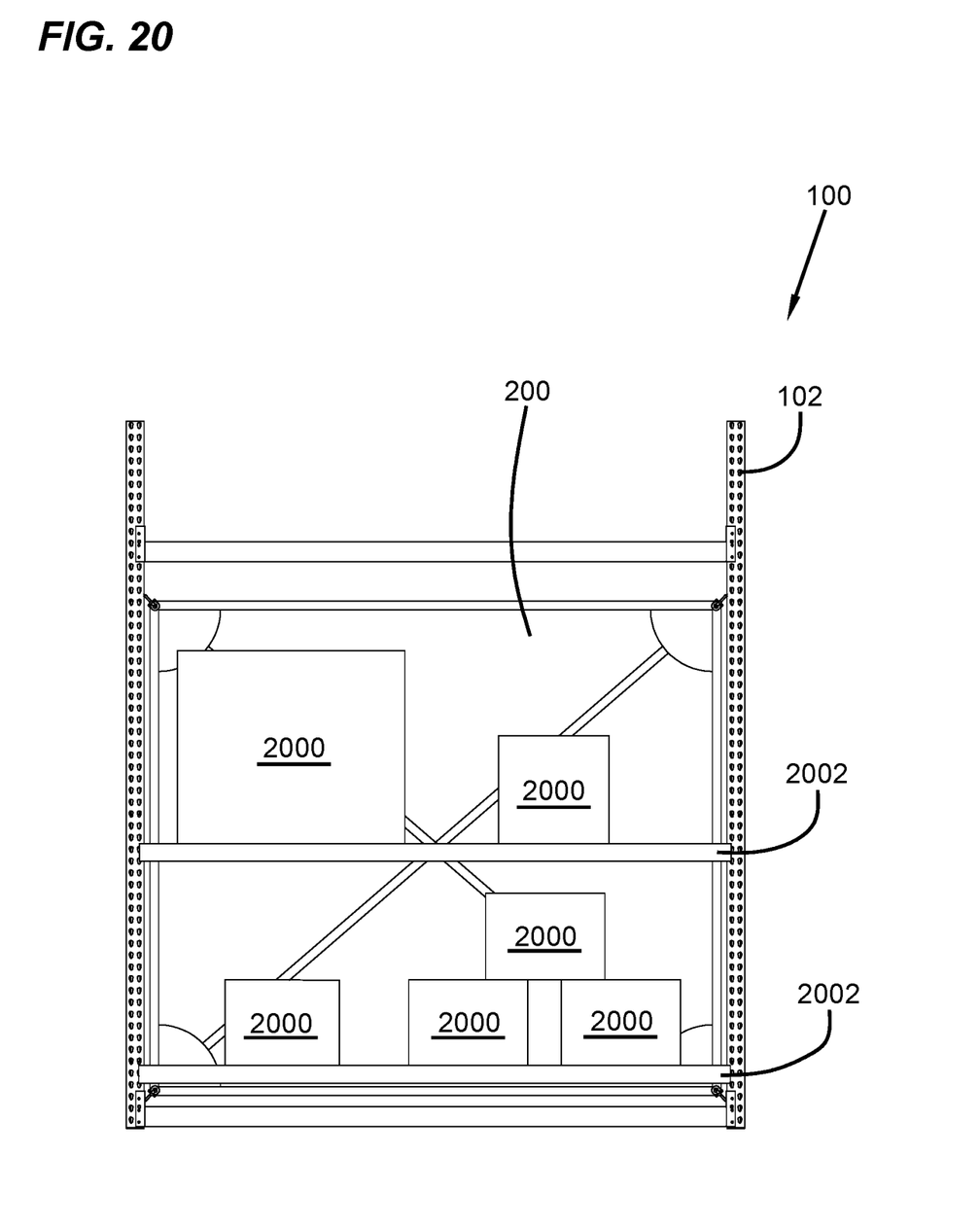
FIG. 20 shows another view of the rack and curtain of FIG. 14 with merchandise positioned thereon.
Figure 21:
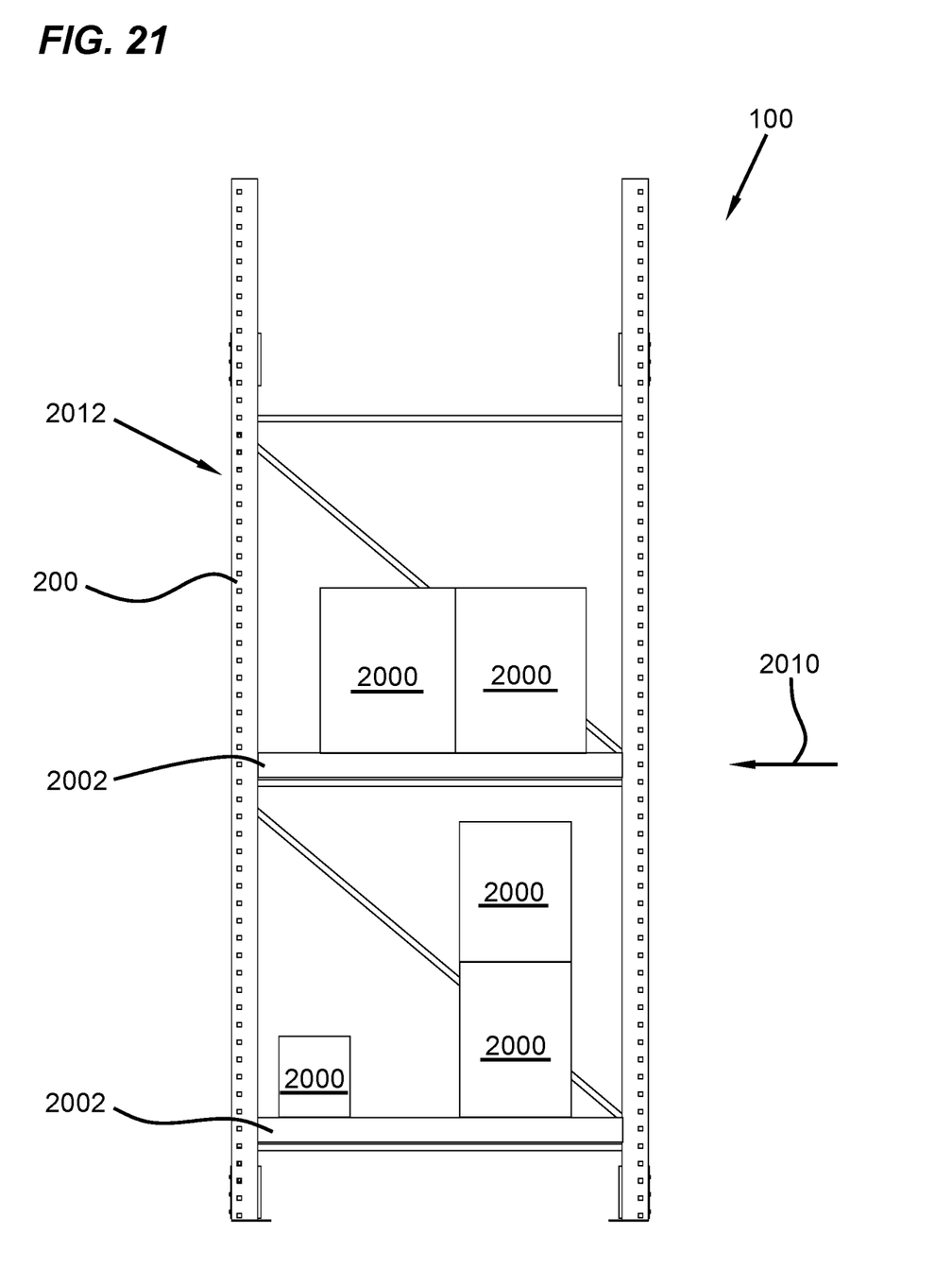
FIG. 21 shows another view of the rack and curtain of FIG. 20.

For example, FIGS. 20-21 show the rack 102 with the curtain 200 installed and merchandise 2000 positioned on shelves 2002 of the rack 102. The curtain 200 functions to prevent the merchandise 2000 from being pushed in a direction 2010 off the backside of the rack 102.

Further, because the curtain 200 is flexible, it is possible to install the curtain 200 onto the rack 102 without removing the merchandise 2000. In other words, the curtain 200 can be flexed to avoid the merchandise 2000 on the shelves 2002 as the curtain 200 is placed into position at a backside 2012 of the rack 102. The corners 220 of the curtain 200 can thereupon be connected to the rack 102 using the tensioning devices 600 without removing the merchandise 2000 from the shelves 2002.

There can be various advantages associated with the curtain described herein. As noted, the curtain can stop the majority of items from being pushed or otherwise falling off the back of warehouse rack shelving. Further, the curtain can be installed with basic tools and without the need to remove merchandise from the majority of shelves. The curtain can be tensioned sufficiently to make it effective for shelves/merchandise in the middle of the rack bay, just as it is on the perimeter. Finally, the curtain can be cost-effective to produce and durable to last for a period of potentially several years.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A curtain system, comprising:
    a curtain forming a flexible body with an opening at each corner of the flexible body;
    a tensioning device at each corner of the flexible body of the curtain to couple the curtain to a backside of a rack, wherein each tensioning device comprises:
        a hook member with a first end sized to engage an opening in the rack and a threaded second end;
        a nut configured to be threaded onto the threaded second end of the hook member to tension the curtain relative to the rack; and
        a body including a first portion and a second portion spaced apart from one another by a third portion, wherein the first portion, the second portion, and the third portion form a U-shape; and
        wherein each of the first portion and the second portion defines an aperture through which the hook member extends.

2. The system of claim 1, wherein the flexible body is a film material.

3. The system of claim 1, wherein the flexible body has a width between 48 inches and 105 inches, and wherein the body has a height between 24 inches and 100 inches.

4. The system of claim 1, wherein each corner of the flexible body is a reinforced corner.

5. The system of claim 1, further comprising a grommet positioned in each opening.

6. The system of claim 1, wherein the tensioning device further comprises a body including a member sized to engage one opening in the flexible body of the curtain.

7. A curtain system, comprising:
    a curtain forming a flexible body with an opening at each corner of the flexible body;
    a tensioning device at each corner of the flexible body of the curtain to couple the curtain to a backside of a rack, wherein each tensioning device comprises:
        a u-shaped body defining an internal space and an external space, wherein the u-shaped body comprises a first plate, a second plate, and an engagement feature, the first and second plates being substantially parallel relative to each other, and wherein the first plate defines a first circular aperture, and the second plate defines a second circular aperture; and
        a hook member extending through the first and the second circular apertures and across the internal space of the u-shaped body, the hook member having a first end sized to engage an opening in the rack and a threaded second end, wherein the first end and a portion of the threaded second end are positioned in the external space when the hook member extends through the first and the second circular apertures of the u-shaped body; and
        a nut configured to be threaded onto the external portion of the threaded second end of the hook member, wherein the engagement feature is configured to engage with an opening of the curtain so that when the nut is threaded onto the external portion of the threaded second end of the hook member, the tensioning device functions to tension the curtain relative to the rack.

8. The system of claim 7, wherein the flexible body is a film material.

9. The system of claim 7, wherein the curtain has a width between 48 inches and 105 inches, and wherein the flexible body has a height between 24 inches and 100 inches.

10. The system of claim 7, wherein each corner of the flexible body is a reinforced corner.

11. The system of claim 7, further comprising a grommet positioned in each opening.

12. The system of claim 7, wherein the u-shaped body of the tensioning device further comprises a connecting plate that extends between and connects the first plate and the second plate, wherein the engagement feature is attached to the connecting plate.

13. The system of claim 7, further comprising the rack, wherein the rack defines an open back, and wherein the curtain spans the open back.

14. The system of claim 13, wherein the rack is a storage rack.

15. The system of claim 14, wherein the storage rack includes shelves to hold items.

* * * * *